United States Patent [19]

McGroarty

[11] Patent Number: 5,376,429
[45] Date of Patent: Dec. 27, 1994

[54] LAMINATED WATERSTOP USING BENTONITE AND BENTONES

[75] Inventor: Patrick J. McGroarty, Spearfish, S. Dak.

[73] Assignee: Paramount Technical Products Inc., Spearfish, S. Dak.

[21] Appl. No.: 81,489

[22] Filed: Jun. 22, 1993

Related U.S. Application Data

[63] Continuation of Ser. No. 742,292, Aug. 8, 1991, abandoned.

[51] Int. Cl.$^5$ .................. D06N 7/04; E04B 1/64; E04C 2/26; E02D 19/00
[52] U.S. Cl. .................. 428/148; 52/169.14; 52/232; 52/408; 52/515; 427/208.8; 428/149; 428/150; 428/307.3; 428/331; 428/337; 428/451; 428/913
[58] Field of Search ............ 428/148, 149, 150, 307.3, 428/331, 337, 451, 913; 52/169.14, 232, 408, 515; 427/208.8

[56] References Cited

U.S. PATENT DOCUMENTS

| | | | |
|---|---|---|---|
| 3,186,896 | 6/1965 | Clem | 428/117 |
| 4,209,568 | 6/1980 | Clem | 428/454 |
| 4,250,172 | 2/1981 | Mutzenberg et al. | 428/244 |
| 4,424,248 | 1/1984 | Tesch et al. | 428/240 |
| 4,501,788 | 2/1985 | Clem | 428/240 |
| 4,534,926 | 8/1985 | Harriett | 264/281 |
| 4,576,864 | 3/1986 | Krautter et al. | 428/331 |
| 4,656,062 | 4/1987 | Harriett | 428/241 |
| 4,693,923 | 9/1987 | McGroarty et al. | 428/148 |
| 4,810,573 | 3/1989 | Harriett | 428/331 |
| 4,837,085 | 6/1989 | McGroarty | 421/451 |

Primary Examiner—George F. Lesmes
Assistant Examiner—Terrel Morris
Attorney, Agent, or Firm—Westman, Champlin & Kelly

[57] ABSTRACT

A laminated waterstop strip used in the construction of buildings that is placed on the top of a surface of a hardened concrete layer of footing, prior to pouring of an additional layer, and is made to have a number of granular layers held with adhesive between each of the layers, and having in the range of 30 to 60 individual granular layers so that the waterstop has a height of in the range of one-half to one inch. The waterstop strip is made up of bentonite granules, preferably, which are adhered to a fabric layer for support, an adhered layer on the exterior of the fabric layer, with a quick release paper on the exterior of the fabric layer. A light weight, synthetic fiber mesh for providing weather resistance, tear resistance, and retention properties is placed over the upper layer of particles. The waterstop strip is made in a batch process before being cut into strips by utilizing a reciprocating multi-station adhesive and particle dispensing carriage that will move back and forth across a desired size sheet of fabric until the number of layers of particles and adhesives have been built to the desired level and the adhesive forms an elastomeric matrix to retain the particles together.

9 Claims, 6 Drawing Sheets

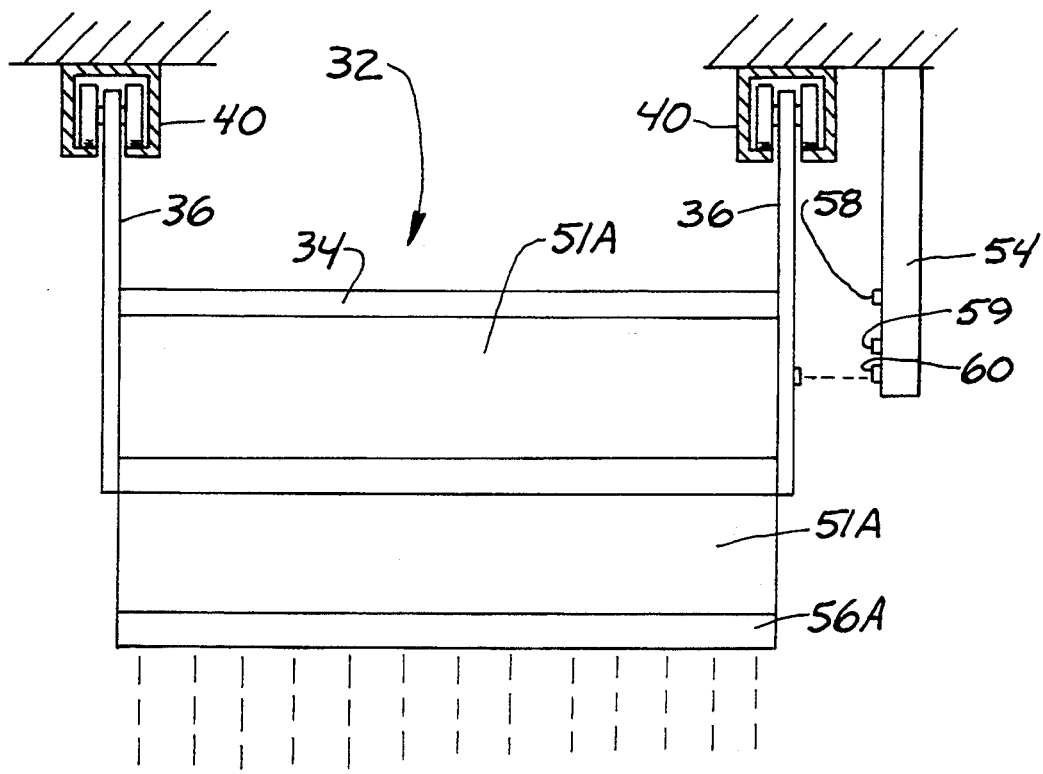
FIG. 2
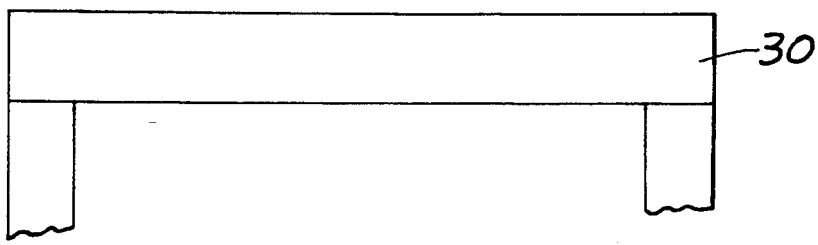
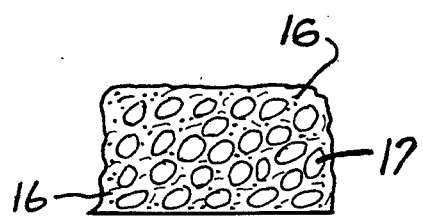
FIG. 8

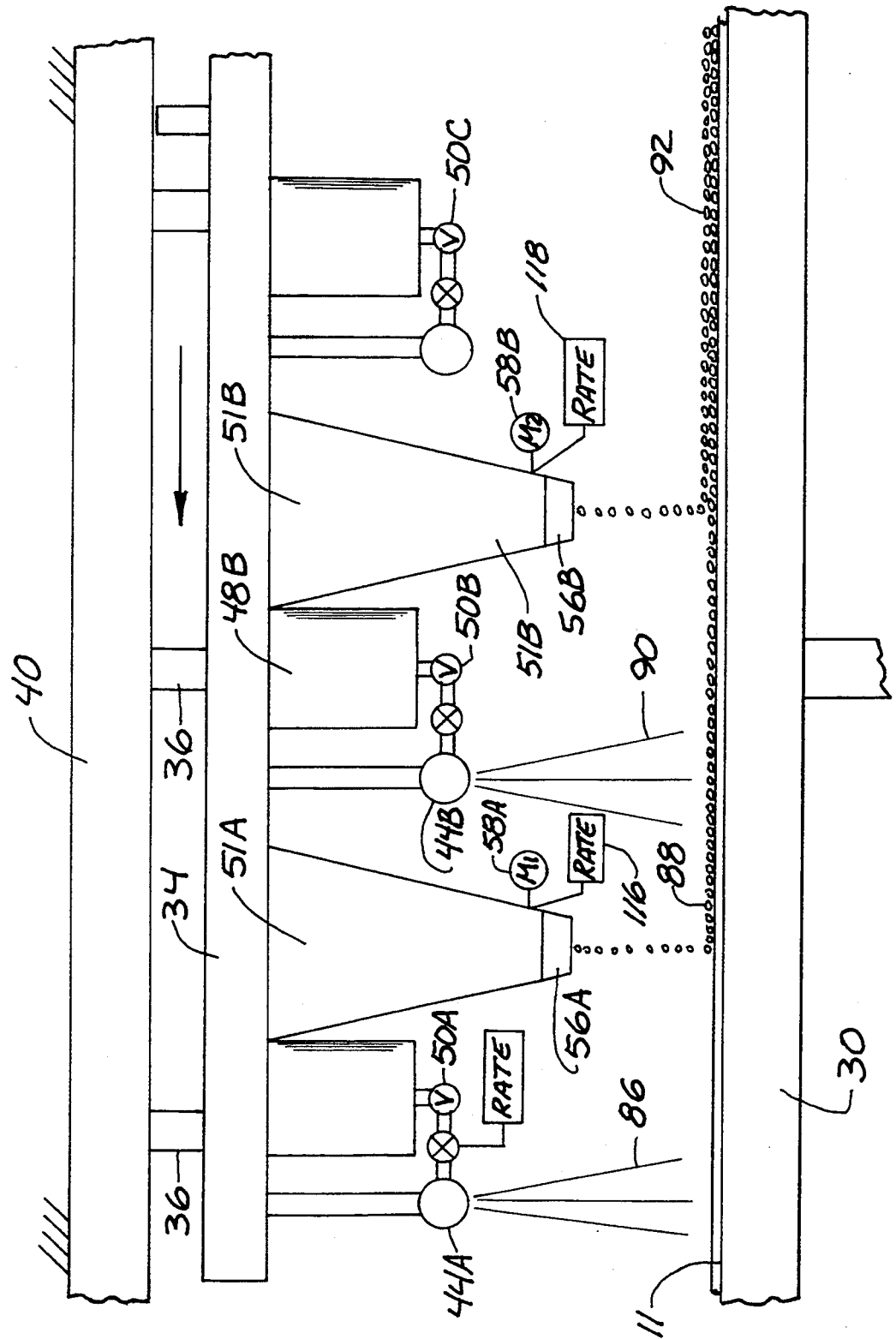

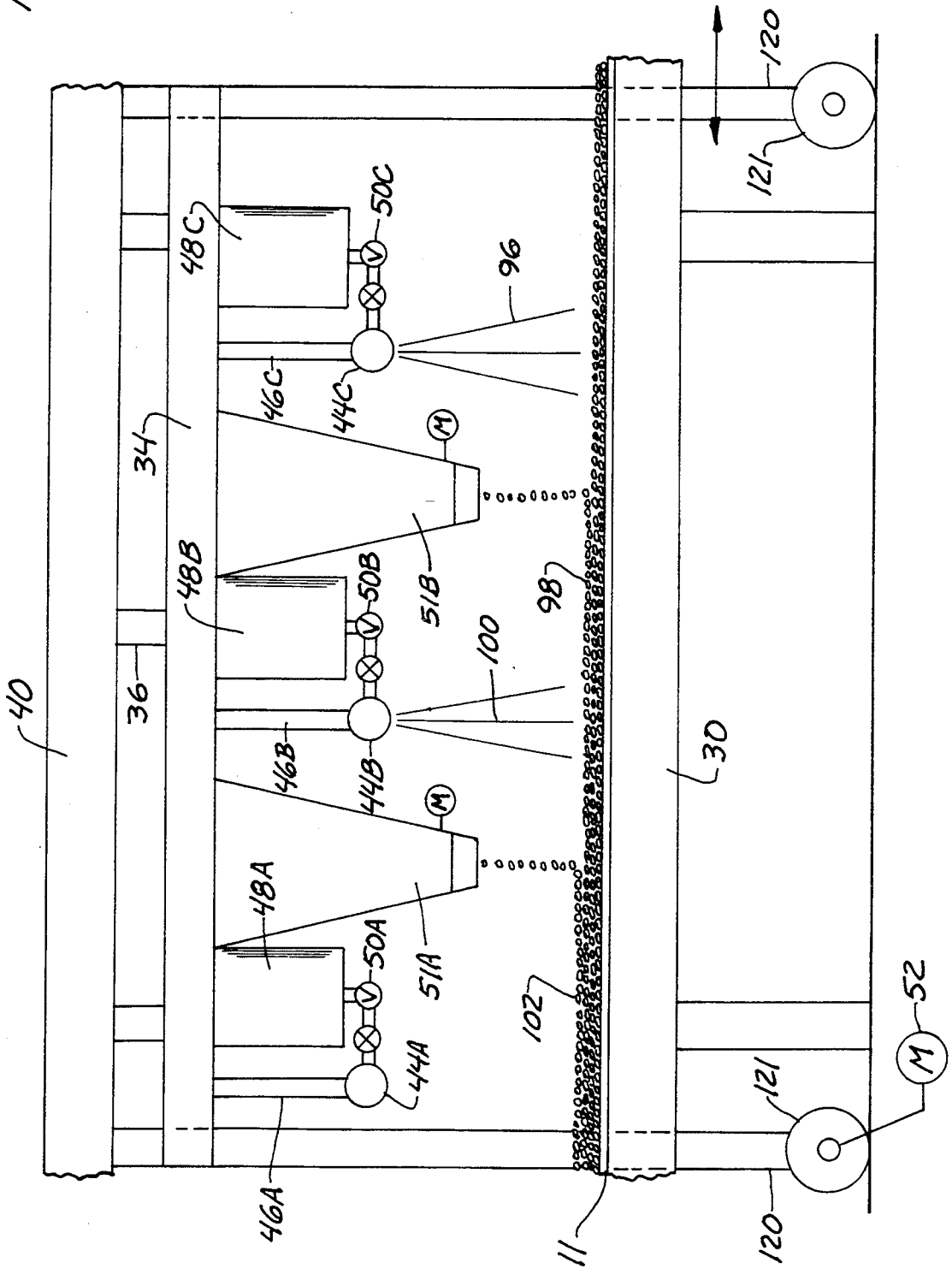

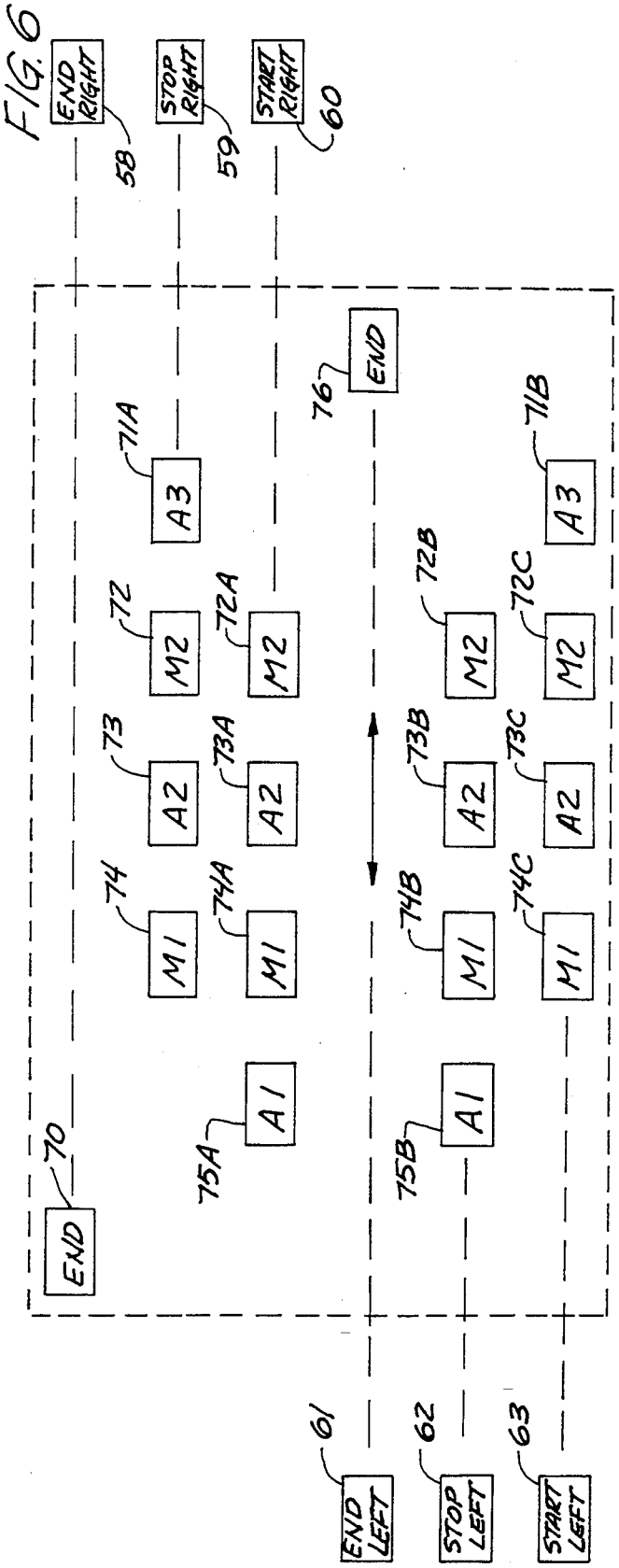
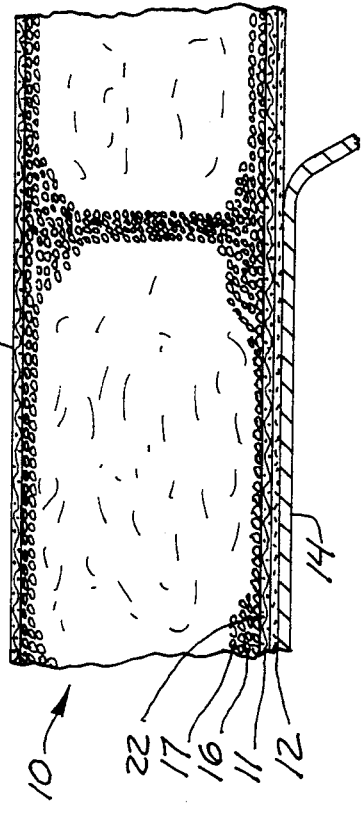

LAMINATED WATERSTOP USING BENTONITE AND BENTONES

This is a continuation of application Ser. No. 07/742,292 filed on Aug. 8, 1991, abandoned as of the date of this application.

BACKGROUND OF THE INVENTION

The present invention relates to a thick waterstop layer utilizing bentonite or bentone (modified bentonite) particles, embedded in layers of adhesive that will keep the particles in position after repeated exposure to liquids that cause swelling. The waterstop provides a conforming liquid stopping layer in seams or joints between poured concrete layers.

Reference is made to a water barrier sheet shown in U.S. Pat. No. 4,693,923, which is made up of a plurality of individual layers of bentonite adhered to each other and to an underlying impervious sheet. Patent '923 illustrates adhesive spray bars and material feed hoppers usable in a new arrangement for making the strip of the present invention, and thus reference to this patent provides details of adhesives that are usable, as well schematic illustrations of adhesive feed controls and on and off controls. However, the device shown in U.S. Pat. No. 4,693,923, does not produce a thick layer of particulate bentonite, in the range of one-half to one inch thick, economically.

It has also been found that the ratio of adhesives to particles should be more when the material is used as a waterstop strip, and in the present invention, which provides an extremely thick waterstop strip made up of individual layers of bentonite adhered together with adhesive, a higher concentration of adhesive is desired. Further maintenance of void spaces between the bentonite particles is desirable to provide for conformability when the waterstop strips are compressed.

Additionally, U.S. Pat. No. 4,837,085 illustrates a prior waterstop strip, and illustrates the type of application to which the improved waterstop strip of the present application will apply.

Further, the use of overlying mesh fabrics, and also support mesh fabrics for bentonite has been known.

In each of these situations, however, the thickness of the layers of bentonite particles, is substantially less. Use of selected bentonite size particles permits the building up of a strip of substantial thickness to provide for full hydration in concrete work at the interface between two pourings, and interstitial spaces which make the strip able to conform to irregular concrete surfaces such as might be formed by workmans foot print or a chip from the concrete footings.

SUMMARY OF THE INVENTION

The present invention relates to a liquid proofing or liquid stop strip that is utilized primarily in interfaces between two types of building materials, or between two separate layers of building materials of the same type. The strip is made of layers of particles embedded in layers of adhesive with a high concentration of adhesive forming a rubber like (elastomeric) support for retaining the particles. The adhesive is in the interstitial spaces between particles and surrounding the particles. The adhesive material forms an elastomeric matrix supporting the particles without degradation ever after repeated cycles of liquid content expansion of the particles and subsequent drying out and reduction in size. The adhesive does have openings whereby water gaining access to the particles to cause swelling, or can be a water based emulsion which will emulsify to open up for water.

A thick layer of particles and adhesive is supported with a fabric layer preferably a synthetic woven fabric, on which a base of adhesive is applied and then alternate layers of bentonite or treated clay (liquid swellable) particles and adhesives are placed in sequence to form a matrix. The fabric will also carry an external layer of pressure sensitive adhesive, covered with a release paper so that the support layer can be placed onto a surface, such as the upper surface of a concrete footing, and it will be retained in place until the subsequent pour of a wall on top of a footing. The waterstop strip also has a use where materials are placed on top of supports because of its ability to conform and compress while providing for the desired effects of waterproofing known from the use of bentonite.

The waterstop strip is made to have, as stated, a plurality of layers of bentonite or bentone particles and adhesives, built up into the range of 30 to 60 granular layers, with the corresponding number of adhesive layers. The top layer of particles is covered with adhesive, preferably an extra layer of adhesive, and then an overlaying with a light mesh that is quite open and will embed into the adhesive to protect against abrasion, and also to tend to hold the strip together. Bentonite swells in water, while bentones, which are treated bentonite particles, will react and swell from hydrocarbon liquid compounds. The bentones can be used for leak proofing hazardous wastes.

The waterstop strips are made first into a sheet that will later be cut into strips, and comprises a fabric sheet having adhesive and a release paper on one side. The fabric sheet is laid onto a support surface underlaying a traveling carriage. The carriage has dispensing hoppers for laying down individual layers of non-hydrated bentonite or other liquid swellable particles, and also has spray bars providing a layer of adhesive to be applied onto the underlying surfaces of the sheet as the carriage moves. At least two material hoppers are used, along with three spray bars that are suitably controlled for providing suitable adhesive layers. The traveling carriage is made to reciprocate back and forth across the underlying fabric sheet, on each path of the carriage laying down two individual layers of bentonite or bentone particles that extend transversely across the entire fabric sheet. The spray bars also extend across the entire sheet so there is adhesive between each layer of particles that insures a desirable final product.

The waterstop product is built up by reciprocating the carriage 15 times to 30 times depending on the number of particles and thickness that are desired, after which the upper surface of the bentonite or other material particle layers is coated with adhesive and an open mesh protective fabric is put into position on the top side of the underlying sheet. The sheet and particles are then rolled up and cut into strips to form the waterstop strips of the present invention that have a substantial height and width of about 1 inch.

The cover fabric is generally a light weight polypropylene mesh to provide a suitable appearance to the exterior or exposed surface of the bentonite or bentone particles, as well as providing for a retention of the particles and tear resistance of the particle bed forming the water proofing strip.

The rolls are shipped to the job site where the release paper is removed, and the adhesive on the bottom supporting fabric can then be adhered to a supporting surface to hold the strip in place.

The use of a multiple pass applicator having multiple depositing stations and reciprocating this applicator relative to the support fabric, and thus to the material that is being deposited, simplifies manufacturer and permits the use because of the individual placement of larger particles of bentonite, than the dust size particles that have been used in various applications before. U.S. standard mesh of 10 to 50 mesh size particles are preferred, which eliminates the dust that has a great saving, not only in adhesive cost, but also in handling problems, such air borne dust. The larger particles also enhance the formation of an adhesive matrix that holds each individual particle in place, but yet, upon wetting, the particles hydrate or swell and exert pressures capable of sealing gaps against liquid passage.

BRIEF DESCRIPTION OF THE DRAWINGS

FIG. 2 is a sectional view taken as on line 2—2 in FIG. 1;

FIG. 3 is a fragmentary enlarged schematic representation of the device of FIG. 1 showing bentonite particles being laid onto an underlying fabric sheet;

FIG. 4 is a schematic view taken substantially in the same position as FIG. 3 showing the assembly moving in an opposite direction;

FIG. 6 is a schematic representation of the location of the sensors and sensor activating elements on the device shown in FIG. 1;

FIG. 7 is a side view of a typical waterstop material made according to the present invention; and FIG. 8 is an enlarged view of particles in an adhesive matrix.

DETAILED DESCRIPTION OF THE PREFERRED EMBODIMENTS

Figure 1:
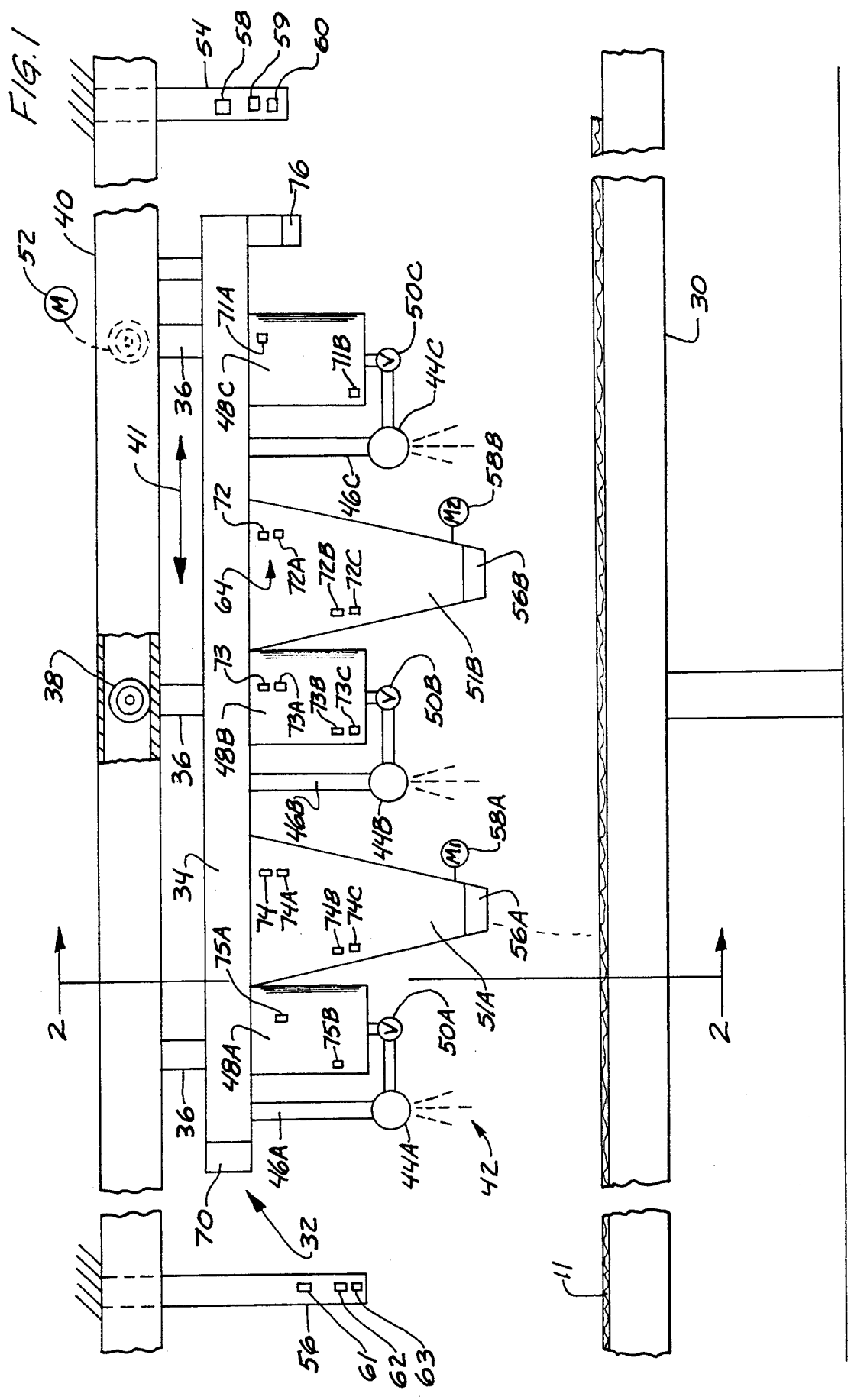
FIG. 1 is a side elevational, schematic view of a apparatus utilized for making the waterstop material of the present invention.

First referring to FIGS. 7 and 8, the waterstop strip made according to the present invention is shown in vertical cross-section. The strips may have a width of substantially 1 to 2 inches and as shown, would have a height of about the same amount. The waterstop strip 10, in its finished form comprises a support mesh fabric sheet 11 that can be made of a suitable woven synthetic fabric. The sheet 11 is a mesh fabric that preferably is porous. This fabric has a layer of adhesive 12 extending to the bottom (exterior) side thereof, covered with a release paper 14, which can be removed, as partially shown in FIG. 7, so that the adhesive layer 12 can be placed against and adhered to a concrete surface that is to be protected by the waterstop strip. This layer 12 can be deposited as the first layer of adhesive deposited from above because of the open mesh of the fabric sheet. The strip is built up of a plurality of individual layers of initially non-hydrated liquid swellable particles (called waterstop particles). The bentonite particles used are of the type that hydrate (swell) in the presence of water. Sodium montmorillinite is suitable. Treated clays are selected to hydrate in other liquids. The particles can thus also be a smectite-type clay that is modified to be organophilic, as exemplified by U.S. Pat. No. 4,434,076 or the types of clays shown in U.S. Pat. No. 2,531,427, or other type of organophilic minerals or clays.

Other particles which swell in presence of liquid hydrocarbons include clays modified with methyl tritallow or di-methyl, di-tallow, according to known methods, which will swell in aliphatic hydrocarbons. Aliphatic hydrocarbons are straight chain carbon components, such as gasoline, kerosene, jet fuel and other petroleum products.

Clays modified with di-methyl benzyl tallow, a di-methyl tallow propoxy or ethoxy will swell in aromatics including benzene and other selected six carbon ring components.

Clays modified with methyl di-tallow benzyl quaternary compounds will swell in both aliphatic hydrocarbons and aromatics. Swelling of the clays may be improved in both mediums by the use of silane coupling agents, zirco-aluminates, chrome aluminates (such as Volan from DuPont Chemical Company), organotitanates, and other materials of like nature. Adding a dispersing or complexing agent will improve effectiveness or quaternary ammonia groups to cause swelling.

Ketones also are useful for modifying bentonite particles to make bentones for waterstop particles for making waterstop strips.

Typical layers are shown at 16, and 17, and then are built up to the height desired, generally comprising between 30 and 60 layers of the selected mesh size particles, preferably in the range of 10 to 50 United States Standard Mesh (2.0 mm down to 297 microns). The strip is built up to the desired height, as stated in the range of ½ to 1 inch, and then is covered with a very fine fabric or mesh indicated generally at 20 which is held in place with adhesive as will be described. The mesh serves to protect the outer layers of the particles, as well as provide for a neat appearance. This cover fabric can preferably be of a fine non-woven polypropylene fabric available as a landscape fabric or similar fabric. The layers of particles are interspersed with layers of adhesive. This adhesive is indicated in the spaces between the particles 21, and is generally shown at 22. The adhesive is applied at a substantial rate so that a continuous layer of adhesive is deposited and even when the adhesive flows into She interstitial spaces there will remain a coating on top of the previously deposited layer of particles sufficient for adherence, but not blocking all liquid passage, which liquid passage is necessary for hydration of the particles. The adhesive is sprayed or deposited in position over a prior layer of particles and immediately prior to applying each individual layer of particles.

The adhesives indicated in U.S. Pat. No. 4,693,923 are suitable for manufacturing this waterstop device, but preferably the adhesive will include a water emulsion base. The acrylic type adhesives also mentioned in U.S. Pat. No. 4,693,923 are suitable, as are the acetate types of adhesives. The acrylic based adhesives are emulsifiable in water when applied and the solids form an elastomeric matrix of when applied at the rates disclosed, after the water has evaporated. The adhesives have a consistency which permits spraying under pressure and uniform application.

The known adhesives that are suitable for use with bentonite or bentones, can be sprayed under pressure or dispensed by gravity in a suitable manner for application. The types of application devices are shown in U.S.

Pat. No. 4,693,923 and the same considerations for application and selection of adhesives are present in the process of manufacturing the waterstop strip disclosed herein.

The machine for making the waterstop strip is illustrated in FIGS. 1 through 6, and as shown comprises a support table 30 that is mounted below a traveling gantry or carriage 32. The gantry comprises a support frame 34 that has suitable support legs 36 mounting onto carriages illustrated at 38 that are supported in a pair of tracks 40. The tracks 40 in turn are supported within the building housing the table 30 at a location above the table. Alternately, the gantry or carriage can be mounted on wheels that would run on a floor surface. The gantry is made to reciprocate in opposite directions along the tracks 40 as indicated by the double arrow 41.

Table 30 is made of a suitable size so that a sheet of the fabric 11 can be laid in position. A length of the fabric sheet 11 in the range of 10 to 15 feet would be usable and a width in the range of 4 feet would be suitable. The support frame 34 is used to support the particle or material applicator mechanisms 42. The granular material dispensing devices and adhesive dispensing devices can be of the same type shown in U.S. Pat. No. 4,693,923. They are supported in a different arrangement in the present device. The applicator frame 32 is a traveling or reciprocating frame that can be manually or automatically controlled.

The carriage 32 includes a first adhesive applicator bar or spray bar 44A, which is called "A1" in subsequent discussions. The spray bar 44A is supported with a suitable support 46 from the frame 34, and it receives material from an adhesive tank 48A, that can be of any desired design. Tank 48A is used for providing a discharge of suitable adhesive to the transversely extending bar 44 (it extends across the width of the fabric sheet that is supported on the table). The adhesive spray bar 44A, is supplied with adhesive material through an electric solenoid valve 50A, that is controlled as will be described.

A second adhesive spray bar 44B, also designated A2, is supported on the frame 34, and is positioned between the granular material dispensing devices 51A and 51B, as will be explained. The spray bar 44B is held with a support 46B from the frame 34 and a tank 48B provides suitable adhesive through a solenoid control valve 50B.

A third adhesive applicator bar 44C is provided on an opposite end of the frame 34 from the bar 44A, and will be referred to subsequently as adhesive applicator A3 as well. This applicator has an adhesive tank 48C that is also supported from the frame 32. The spray bar 44C can be supported from the frame with a support 46C. The control of adhesive is with a solenoid valve 50C, which, when on, will provide adhesive to be sprayed downwardly onto the sheet supported in table 30 as the carriage 32 travels back and forth.

The carriage 32 is power driven in a suitable manner from a motor indicated generally at 52, which is a reversible, variable speed motor that can be controlled in the process as needed to provide the necessary depositing of the layers of individual particles.

At each end of the tracks 40, schematically shown, are support bars 54 and 56 respectively, that support proximity detectors as will be explained, for controlling operations by providing signals when sensing surfaces on the various components pass the proximity detectors. The proximity detectors are used for individually operating each of the valves 50A, 50B and 50C. The frame 34 also, as stated, provides support for a pair of granular material applicators 51A and 51B which are used for dispensing non-hydrated (dry) waterstop particles onto the fabric held and supported on the table 30. The applicators comprise hoppers that contain bentonite or Ketone particles (particles which swell in presence of liquids) with feeding devices 56A and 56B at the lower ends thereof. Suitable material dispensers that control material flow are electric solenoid operated, and are indicated at 58A and 58B, respectively. These material dispensers are referred to as M1 (51A) and M2 (51B) subsequently.

Additional hoppers can be provided if desired, but the double hopper and the reciprocating drive provide for an arrangement that is suitable for relatively rapidly building up the number of layers of particles necessary for the waterstop strip of the present invention.

The reciprocating drive is operated by a programmable logic system or control which is designed with normal digital controls or analog controls as desired. The unit can have manual overrides.

The support bar 54 includes a first proximity detector 58 which is an "end right" detector a second proximity detector 59 which is a "stop right" detector and a third proximity detector 60, which is a "start right" detector. These detectors are used for controlling the dispensing as well as the motor 52 as the carriage 32 travels back and forth.

The support bar 56 includes an "end left" proximity detector 61, a "stop left" proximity detector 62, and a "start left" proximity detector 63. The support bars 54 and 56 are positioned adjacent the ends of the unit, beyond the start and stop edges of the sheet 11 that is being provided with the coating of adhesive and swellable waterstop particles, so that the carriage 32 can travel the desired distances beyond the start and stop edges, and provide the same number of particle layers on the fabric sheet 30 adjacent each end of the sheet.

Each of the individual adhesive spray or dispenser bars, and each of the waterstop material hoppers is provided with a sensing surface on the sides of the units that are shown schematically at 64 as small patches. These are metal sensing surfaces that are mounted in a suitable location and orientation to provide the necessary signal to the proximity detectors and control circuitry for turning on and off the solenoid valves and material metering devices, as well as reversing motor 52.

The sensing surfaces are metal plates mounted onto an insulating base, so that when they pass next to an aligned proximity detector, a true actuator signal will be obtained when they pass the proximity detectors. Proximity switches or detectors are conventional items, and the lay out of the sensing surfaces on the carriage is shown schematically in FIG. 6, and is provided in connection the simplified logic diagram of FIG. 5. The adhesive spray or dispenser bars, are again labeled, A1, A2 and A3, and the individual sensing surfaces are horizontally aligned with the proximity detectors at the right end and left end of the tracks, respectively.

Aligning with the end right proximity detector 58 that indicates the right end, is a sensing surface 70 which is at the left hand end of the frame 34, and this is the only sensing surface that aligns with that particular proximity detector. In regard to the proximity detector 59, there are four sensing surfaces aligning with such detector including a sensing surface 71A that is on the spray bar 44C (A3), a sensing surface 72 which is on the material dispenser 51B (M2), a sensing surface 73, which is on the adhesive dispenser 44B (A2), and a sensing surface 74, which is on the material dispenser 51A (M1).

The adhesive dispenser 44A has no sensing surface aligning with the "stop right" proximity detector 59.

The alignment with the proximity detector 60 includes a sensing surface 72A, on material dispenser M2 or 51B, and a sensing surface 73A that is on the A2 adhesive dispenser, an alignment surface 74A, which is on the material dispenser 51A (M1) and a sensing surface 75A which is placed on the adhesive dispenser 44A (A1).

The proximity detector 61 at the left end of the track or table 30 aligns horizontally with an end sensing surface 76 that is on the right hand end of the frame 34, as shown in FIG. 1. That will come close to the proximity detector 61, when the frame 34 has moved all the way to the left.

Aligning with the proximity detector 62 is a sensing surface 75B, that is mounted on and is used to control the dispenser 44A (A1); a sensing surface 74B that is on the material dispenser 51A (M1), a sensing surface 73B which is on the adhesive dispenser 44B (A2); and a sensing surface 72B which is on the material dispenser 51B (M2). Horizontally aligning with the proximity detector or switch 63 is a sensing surface 74C, that is on the material dispenser 44A (M1), a sensing surface 73C which is on the adhesive dispenser 44B (A2); a sensing surface 72B which is on the material dispenser 51B (M2), and a sensing surface 71B, that is on the adhesive dispenser 44C (A3).

As the carriage 32 moves back and forth, each time a sensing surface passes the respective proximity detector, the detector will provide a pulse or will be turned on, and then this signal indicating the presence of the sensing surface, will discontinue after the surface has passed the detector. This provides a pulse type signal and in the overall logic circuit shown in FIG. 5, these pulses are provided to conventional counters. The simplified circuit in FIG. 5 does not include many of the set and reset functions, or other known circuitry for making counters operate. Suitable power will be provided, of course.

Figure 5:
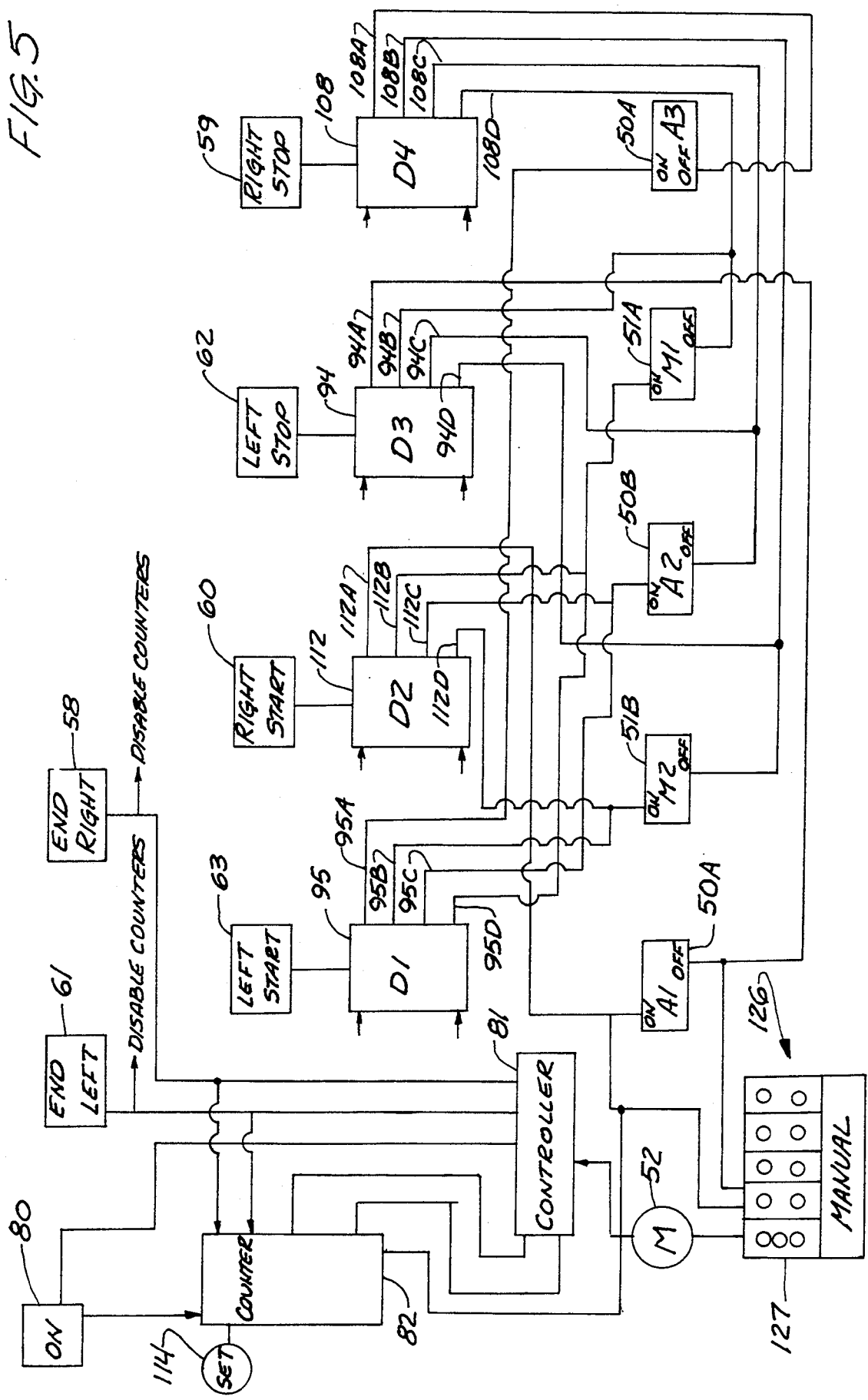
FIG. 5 is a schematic block diagram simplified representation of a control system usable with the present invention by way of illustration purposes only.

The number of passes of the carriage back and forth also is controlled by the logic circuit shown in FIG. 5, as indicated very schematically. The main "on" switch 80 provides power to a motor controller 81, that controls the motor 52, and which can be reversed to reverse the motor 52. The motor 52 also can be speed controlled. A main counter 82 is used for initializing and setting the controller to turn on the motor 52. This will be also set so the motor resets the carriage 52 to its start position at the right hand side of the table 39, with the sensing surface 70 just clearing the "end right" detector 58.

When the carriage 32 is traveling to the left, in a first pass, as shown in FIG. 3, a layer of adhesive 86 is laid down from the adhesive dispenser 44A (A1) and a first layer of bentonite particles is laid down as shown at 88 in FIG. 3 on top of the layer of adhesive, and supported on the fabric 11. The first layer of adhesive can be the adhesive that is used with the release sheet in that She adhesive will pass through the openings in the base fabric (mesh) sheet. A second layer of adhesive 90 is applied over the particles 88, by the dispenser 44B (A2) and the second layer of particles, indicated at 92 is laid down over the adhesive layer 90 from the material dispenser 51B (M2). The adhesive dispenser 44C (A3) is not operating in this mode, and the unit will continue to travel to the left until, referring to FIG. 1, sensing surface 75B for A1 passes proximity switch 62, which is the "stop left" side. This will provide a signal to a counter 94 which is indicated at D3 in FIG. 5, providing a signal along the line 94A to the off control for valve 50A controlling the dispensing of adhesive from spray bar A1.

As the carriage continues to travel to the left, the signals from the stop left detector will be activated by the passage of sensing surface 74B. The start left detector 63 will be locked out of the circuit until a signal is received indicating the passage of the entire frame 34, so the sensing surface 74C will not cause any signal at this stage, nor will the sensing surfaces 73C, 72C or 71B.

When the signal from the sensing surface 74C is received, it will provide a pulse from the detector 62 to the out-put 94B of counter 94 which will in turn, turn off the dispensing control for particle or granular material dispenser 51A (M1). When sensing surface 73B passes the stop left proximity detector switch 62, a pulse from this detector will trigger the counter D3 one more step, so that line 94C, provides a signal for turning off the valve 58B for adhesive material dispenser A2. Finally, as the carriage 32 continues to move to the left, sensing surface 72B will pass the proximity detector 62 and provide another trigger signal to the counter 94, providing a signal on line 94D to turn off the solenoid control 58A (M1) for the material dispenser 51B. These solenoid controls are represented as blocks in FIG. 5, schematically.

Then, as the carriage continues to pass to the left, the sensing surface 76 at the very right hand end of the frame 34 will move pass the stop left proximity detector 62 providing a signal that is an end left signal from the proximity detector 61.

The end left signal will be used for reversing the drive motor 52 through controller 81, and also will be used to provide a signal to disable the stop left detector 62 and enable the start left detector 63. A time delay may be provided between the stop and start signals. As the carriage 32 then moves toward the right, the first sensing surface that will move past the start left detector, will be sensing surface 71B that provides a signal from detector 63 to counter D1 indicated at 95 and provide an output on the first output line 95A to turn on the valve 50C controlling the adhesive spray bar 44C (A3). Then, A3 will start dispensing a layer of particles of material as shown at 96 in FIG. 4, that will be on top of the layer of particles 92. As will be further explained, the particulate material dispensers will be activated so that dispenser 51B (M2) will provide a layer of particles 98 over the adhesive layer indicated at 96. The second adhesive spray bar 44B will be dispensing adhesive indicated at 100 above the newly dispensed particle layer 98. The first material dispenser 51A will be dispensing a layer of particulate waterstop material 102 on top of the adhesive dispensed by bar 44B indicated at 100. The adhesive applicator spray bar 44A will not be operating as the unit moves to the right.

When the sensing surface 72C passes the proximity detector 63, counter 95 will be triggered and a second line 95B will be provided with a signal to the on side of the electric solenoid valve M2 for dispenser 51B, and turn on this material dispenser to provide for dispensing the layer 98 of waterstop particles.

The carriage will continue to be driven by the motor 52 to the right, and sensing surface A3 will pass the detector 63, which provides a pulse energizing the line 95C to turn on the solenoid valve 50B for adhesive dispenser 44B (A2). Sensing surface 74C passes the detector 63 in sequence, as the carriage moves to the right, and this will clock the counter 95 to provide a signal on line 95D to turn on the valve or dispenser for the particulate material dispenser 51A (M1). The particle layer 102 will be dispensed, and since the adhesive applicator bar or spray bar 44A is not operating, the carriage will continue to move toward the right until it again comes to a position where the sensing surface 71A will pass the stop right proximity detector 59 providing a signal to the counter 108 (D4) so that a signal on line 108A goes to the off terminal of the solenoid valve 50C turning off the adhesive dispenser 44C (A3). The sensing surface 72 will pass the stop right proximity detector 59 causing a signal on line 108B to turn off the solenoid control for material dispenser M2. Sensing surface 73 will pass the proximity detector 59, clocking the counter 108 one more time to provide a signal on line 108C to turn off the solenoid valve 50B for material dispenser 44A (A2) and the sensing surface 74 will then pass the proximity detector 59 to clock the counter 108 to provide a signal on line 108D to turn off the material dispenser 51A (M1).

The carriage unit will continue to travel until the end sensing surface at the left end of the frame 34 indicated at 70 passes the end right proximity detector 58 which provides for the signals that will reverse the motor 52, and disable the proximity detector 59 and enable the detector 60, as well as disabling the "start left" detector 63 and enabling detector 62. It should be noted that the signal from detector 61 would be used to disable the detector 60 at an appropriate time. In reverse direction, then, the sensing surface 75A passes the start right signal switch 60 that controls the counter 112, and in sequence, the sensing surfaces 74A, 73A and 72A clock the counter 112 to energize sequentially lines 112A, 112B, 112C, and 112D, to sequentially turn on the adhesive applicator A1, the particulate waterstop material dispenser 51A, the adhesive applicator A2, and the particulate waterstop material dispenser 51B. Adhesive dispenser 44C is not turned on.

The carriage 32 then will reciprocate back and forth for a number of counts that can be set with a count setter at 114 leading to the counter 82. When the count of counter 82 is complete the controller for the motor 52 will be shut off, and then the final overlay of the fine fabric will be placed on the waterstop (after 30 to 60 layers of material). On the final pass, the starting adhesive dispenser, which is normally turned off, will be activated to provide an adhesive layer on top of the last bentonite layer.

The counter 82 is made so that it decrements by counts of one, each time the end left or end right proximity detectors provide a signal. When the counter reaches the end of its count, such as in the range of 60 counts when 30 layers of particles are to be applied, then the counter indicates that the set of instructions is over, and it can shut down the system. One count short of the end of the counter set that is set with the thumb wheel 14 can provide a signal to activate the leading spray bar, without activating any of the other spray bars or the material dispensing controls, such as that shown in the drawing to activate spray bar A1, and provide a single layer of adhesive over the last layer of particles that is deposited. Alternatively, the trailing spray bar can be activated on the last pass, as discussed. This provides for automatically placing an upper layer of adhesive that will hold the loose woven mesh fabric that is used as a cover in place.

A truth table for the electric solenoid and actuators A1, A2, A3 and M1 and M2 is represented below as Table 1, illustrating the control counts of counters D1-D4.

TABLE 1

|    | Turned on by:   | Turned off by:  |
|----|-----------------|-----------------|
| A3 | D1 = 1          | D4 = 1          |
| M2 | D1 = 2, D2 = 4  | D4 = 2, D3 = 4  |
| A2 | D1 = 3, D2 = 3  | D4 = 3, D3 = 3  |
| M1 | D1 = 4, D2 = 2  | D4 = 4, D3 = 2  |
| A1 | D2 = 1          | D3 = 1          |

It should be also noted that the rate of application of the granular waterstop material can be provided through suitable rate controls 116 and 118, on the material dispenses.

The waterproofing material of fabric with the built up layers of bentonite is rolled into a bulk roll, and subsequentially slit into one inch wide strips to be used as the waterstop strips.

The labor utilized with the reciprocating carriage is substantially reduced. The control provides for a good control of adhesive and particles so that each particle layer has a generous layer of adhesive on top to hold the particles together well, and from a non-deteriorating matrix of adhesives. A one to one granular layer to adhesive layer ratio, that is one layer of adhesive to one layer of granules, is important to prevent de-lamination which can occur if two dry granular layers are applied without an adhesive layer between them to bond the layers together, as the waterstop strip hydrates and then dehydrates in use. A layer of adhesive in the range of 1 mil to 2 mils in thickness is provided. The adhesive emulsion is liquid so that it flows into interstitial spaces for forming a matrix of elastomeric material that can cycle between hydration and drying of the particles.

There are substantial interstitial spaces or air voids around the granules that will increase as the emulsion carrier or solvent for the adhesive evaporates, which provides a matrix of elastomeric solids that stretch and give, but which do not deteriorate from use. The strip has a resilient, compressible character, so that the waterstop strip can compress to conform to irregular surfaces, as well as change in internal size.

A device that has mesh size and 10 to 50 U.S. Standard mesh size granules is also desirable in manufacture because of the elimination of dust as well as having substantial void volume.

It should also be noted that various types of logic controls can be utilized, and that these are merely representative of a schematic arrangement that will show that the gantry can be reciprocated.

As shown in FIG. 4, the frame 84 can be supported on upright posts 120 that are mounted on wheels 121, and the wheels 121 then can be driven from the motor 52. The wheels 121 can be mounted on floor supported rails, or other guides.

The individual solenoids 50A, 50B, 50C, and controls 58B and 58A can be manually operated, and also the motor 52 can be manually operated and reversed in direction. Manual controls 126 include individual switches 127 for controlling the solenoids and the motor 52. The motor has forward, reverse and "on" buttons. The on and off sequencing can be done manually. In some instances, such as the last pass, the trailing adhesive spray tube may be operated, to add a layer of adhesive over the exterior layer of granules. The top layer of adhesive helps to bond the waterstop strip together and holds the additional loose fabric or open mesh that is placed on the exterior of the waterstop strip. The adhesive is applied in a concentration of 15% to 30% of the strip weight, so a high adhesive content is provided for the matrix.

In applications where the waterproofing strip is left in standing water before a wall is poured, for example, it may be desirable to seal the strip side surfaces with a slowly water degradable adhesive. The layer would be applied to coat the side after the strip is slit from the sheet. It can be done manually while the strip is rolled. The adhesives would be selected to keep liquid away from the swelling particles initially, but which would open or degrade with time so the leakproofing action would be available when needed.

It should be also noted that the program can provide safety features such as a delay during the reversal of the frame member 34, and the block out of right travel functions during left travel and vice versa. Further, blocking out of the start proximity detectors when the stop detectors are being activated can be carried out utilizing the signals that indicate "stop right" and "stop left" for the carriage.

What is claimed is:

1. A waterstop strip comprising a base sheet of open mesh porous flexible material, supporting a layer consisting essentially of:
   a plurality of individual layers of particles which hydrate and swell in the presence of liquid and which dehydrates as the liquid dries, and a separate network of adhesive in interstitial spaces to form a matrix between particles and between individual layers of particles, the adhesive and the particles being built up to in the range of ½ to 1 inch in thickness measured normal to a base sheet; and
   an overlying open mesh layer on the exterior of said built up layer of particles, said strip having substantial interstitial spaces that are filled with air to permit compressing the strip under exterior forces while being held together by the matrix of adhesive, the adhesive comprising elastomeric solids which remain flexible to permit conforming to irregular shapes as the strips compress and which hold the particles together during repeated hydration and dehydration.

2. The strip of claim 1, wherein said strip has a width of approximately 1 inch.

3. The strip of claim 1, wherein said mesh base sheet is sufficiently porous so an adhesive layer passes through the mesh to the exterior thereof, and a removable release paper over the adhesive layer on the exterior of the base sheet.

4. The strip of claim 1 wherein the particle size ranges between 10 and 50 U.S. Standard mesh size.

5. The strip of claim 4 wherein the adhesive is between 15% and 30% of the total weight of the strip and is substantially uniformly distributed across the thickness of the strip.

6. The strip of claim 5, wherein the plurality of adhesive layers comprise adhesive layers each having a thickness of in the range of one to two mils.

7. The strip of claim 1, wherein the strip is constructed of an adhesive overlying the built up layers of particles, and the overlying mesh layer being adhered to the layer of adhesive on the exterior of the built up layer of particles.

8. A narrow, elongated liquid stop strip for interspersing between portions of building material consisting essentially of an open mesh porous base layer having adhesive deposited over the mesh and extending through to the exterior to provide an exposed adhesive surface, a plurality of individual layers or particles which hydrate and swell in the presence of liquid and which dehydrate as the liquid dries, and adhesive layers alternately formed with particle layers over the mesh base layer to form a matrix of adhesive between particles and the individual layers of particles, the adhesive and particle layers being built up to a thickness to provide waterproofing between the portions of building material, an overlying open mesh layer on a surface of said built up layers of particles opposite from the base layer, said liquid stop strip having substantial interstitial spaces which are filled with air to permit compressing the strip under exterior forces while being held together by the matrix of adhesive, the adhesive comprising elastomeric solids which remain flexible and hold the particles together during repeated hydration and dehydration.

9. The narrow elongated liquid stop strip of claim 8, wherein the overlying open mesh layer is embedded in a layer of adhesive applied to the exterior of the immediately adjacent layer of particles.

* * * * *